(12) United States Patent
Strijker

(10) Patent No.: US 7,903,436 B2
(45) Date of Patent: Mar. 8, 2011

(54) SMART BLANKING CIRCUIT FOR SYNCHRONOUS RECTIFICATION IN A SWITCHED MODE POWER SUPPLY

(75) Inventor: Joan Wichard Strijker, Wijchen (NL)

(73) Assignee: NXP B.V., Eindhoven (NL)

( * ) Notice: Subject to any disclaimer, the term of this patent is extended or adjusted under 35 U.S.C. 154(b) by 468 days.

(21) Appl. No.: 12/091,028

(22) PCT Filed: Oct. 18, 2006

(86) PCT No.: PCT/IB2006/053849
§ 371 (c)(1),
(2), (4) Date: Apr. 21, 2008

(87) PCT Pub. No.: WO2007/049195
PCT Pub. Date: May 3, 2007

(65) Prior Publication Data
US 2008/0247196 A1    Oct. 9, 2008

(30) Foreign Application Priority Data

Oct. 27, 2005  (EP) .................................... 05110099

(51) Int. Cl.
*H02M 3/335* (2006.01)
(52) U.S. Cl. ...................... 363/21.14; 363/21.06; 363/89
(58) Field of Classification Search ............... 363/21.06, 363/21.14, 89, 127
See application file for complete search history.

(56) References Cited

U.S. PATENT DOCUMENTS

| | | | | |
|---|---|---|---|---|
| 6,002,597 A | * | 12/1999 | Rozman | |
| 7,408,796 B2 | * | 8/2008 | Soldano | 363/127 |
| 2003/0067794 A1 | * | 4/2003 | Boylan et al. | |
| 2004/0109335 A1 | * | 6/2004 | Gan et al. | |
| 2005/0122753 A1 | * | 6/2005 | Soldano | 363/125 |

FOREIGN PATENT DOCUMENTS
EP    0736959 A1 * 10/1996

OTHER PUBLICATIONS

Librizzi, F; et al "STSR3 Simplifies Implementation of Synchronous Rectifier in Flyback Converter" ST AN1624 Application Note. Jan. 1, 2003, pp. 1-22.

* cited by examiner

*Primary Examiner* — Jeffrey L Sterrett

(57) ABSTRACT

In a controller (CC2) for controlling a synchronous rectification switch (S2), the controller (CC2) comprises a sensing circuit (SRL) for sensing an output (D2) of the synchronous rectification switch (S2) at an end of a blanking time to obtain a sense signal (Q), and a control signal generating circuit (AND1) for generating a control signal (G2) for the synchronous rectification switch (S2) in dependence on the sense signal (Q).

4 Claims, 5 Drawing Sheets

SMART BLANKING CIRCUIT FOR SYNCHRONOUS RECTIFICATION IN A SWITCHED MODE POWER SUPPLY

The invention relates to a switched mode power supply with a synchronous rectifier.

ST Microelectronics' Application Note AN1804 describes the functionality and the operation of the STSR30 device used as the secondary synchronous rectifier driver in flyback topology switched mode power supplies. From a synchronizing clock input, withdrawn on the secondary side of an isolation transformer, the IC generates a driving signal with set dead times with respect to the primary side PWM signal. When the primary switch is turned off, usually a spike and a ringing are present at its drain. This voltage, reflected on the secondary side, determines a noise in an INHIBIT pin which could cause a false detection of discontinuous mode. To avoid this, a blanking time is present in an INHIBIT comparator. Once the clock falling threshold is detected, the INHIBIT comparator is disabled for 700 ns avoiding any false triggering due to switching noise. If the noise on the Inhibit pin lasts more than 700 ns, it is possible to increase the blanking time adding derivative circuit in parallel to an Inhibit resistor. A capacitor and a resistor determine the blanking time value. This time has to last the necessary time to cover the ringing caused by the primary switch turn-off.

It is, inter alia, an object of the invention to provide an improved switched mode power supply with a synchronous rectifier. The invention is defined by the independent claims. Advantageous embodiments are defined by the dependent claims.

In a controller for controlling a synchronous rectification switch in accordance with one aspect of the invention, the controller comprises a sensing circuit for sensing an output of the synchronous rectification switch at an end of a blanking time to obtain a sense signal, and a control signal generating circuit for generating a control signal for the synchronous rectification switch in dependence on the sense signal.

The invention has resulted from the following considerations. The problem with increasing the blanking time beyond 700 ns is that the blanking may become too long. A too long blanking time will cause energy loss as the energy is transferred back to the input of the converter. As energy is send from the input of the converter and back, some energy is lost as the efficiency will never be 100%.

In accordance with an embodiment of the invention it is possible to make a longer blanking time without this energy loss. Basically the circuit detects if the blanking time is too long and than switches off the synchronous rectification. More specifically, when the conduction time of the synchronous switch is lower than the blanking time, the synchronous rectification is disabled. As disabling the synchronous rectifier is only done for times shorter than the blanking time, this will hardly affect the efficiency of the converter. The invention thus yields a system, which is not susceptible to ringing, while keeping the efficiency high.

In an embodiment of the invention, the minimum on-time of the synchronous rectification switch is defined by the blanking time. As soon as the required on-time is smaller than the blanking time, the synchronous rectification will be disabled. By sampling the drain signal of the synchronous rectification switch right after the blanking time, a signal can be generated to enable or disable the synchronous rectification. This will ensure proper switching and will maximize the efficiency in all situations.

These and other aspects of the invention will be apparent from and elucidated with reference to the embodiments described hereinafter.

Figure 1:
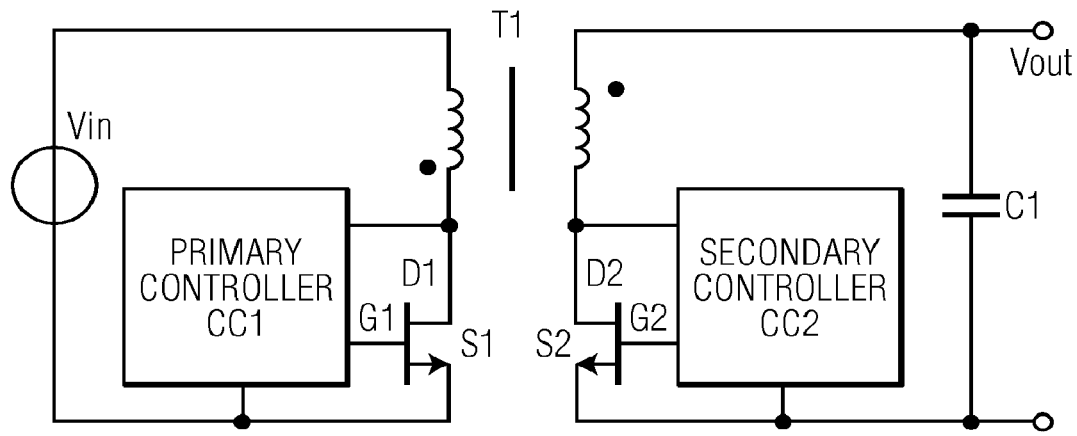
FIG. 1 shows an embodiment of a switched mode power supply with synchronous rectification.

FIG. 1 shows an embodiment of a switched mode power supply with synchronous rectification. A series connection of a primary winding of a transformer T1 and a primary switch S1 is connected between the terminals of a voltage source Vin. A primary controller IC CC1 receives a drain voltage D1 of the primary switch S1 and controls a gate voltage G1 of the primary switch S1. A series connection of a secondary winding of the transformer T1 and a secondary switch S2 is connected between the terminals of an output capacitor C1 from which the output voltage Vout can be obtained. A secondary controller IC CC2 receives a drain voltage D2 of the secondary switch S2 and controls a gate voltage G2 of the secondary switch S2.

Figure 2:
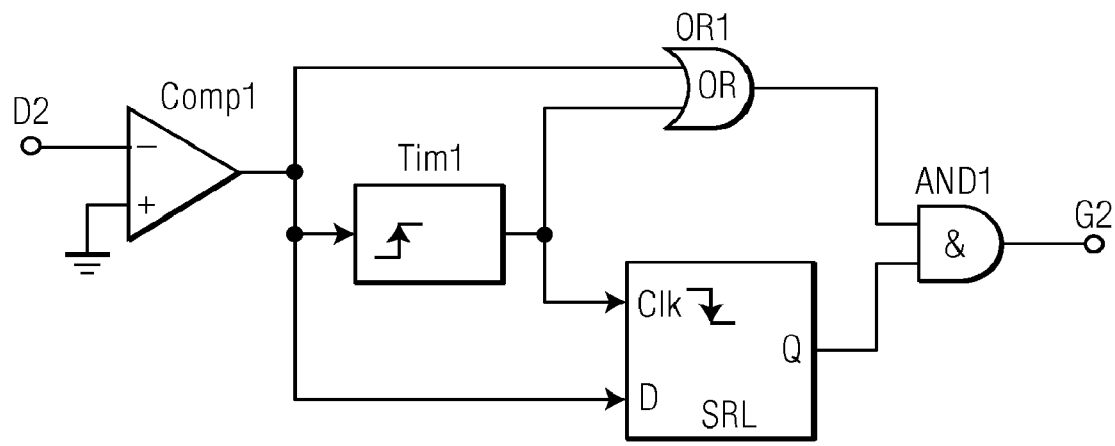
FIG. 2 shows an embodiment of a secondary controller for use in the circuit of FIG. 1.

FIG. 2 shows an embodiment of a secondary controller CC2 for use in the circuit of FIG. 1. Comparator Comp1 outputs a voltage indicating a positive or negative drain voltage D2. As soon as the drain voltage D2 drops below zero, the output of comparator Comp1 will become high and a timer Tim1 is started. The OR circuit OR1 will than output a high signal and when the synchronous rectification latch SRL is enabled, AND circuit AND1 will output a high signal. At the falling edge of the blanking time (Tim1), the output voltage of comparator Comp1 is sampled by the latch SRL. To this end, the output of the timer Tim1 is connected to a clock input Clk of the latch SRL, and the output of the comparator Comp1 is connected to a D input of the latch SRL. When the drain voltage D2 is low after the blanking time, the latch SRL will be set. When the drain voltage D2 is high after the blanking time, the latch SRL will be reset. The latch SRL thus senses an output voltage D2 of the synchronous rectification switch S2 at an end of a blanking time to obtain a sense signal at an output Q of the latch SRL, and the AND circuit AND1 generates a control signal G2 for the synchronous rectification switch S2 in dependence on the sense signal at the output Q.

FIGS. 3-6 explain how synchronous rectification is enabled and disabled. In these figures, D2 denotes the drain voltage of the field effect transistor forming the secondary switch S2, BS denotes a blanking signal at the output of the timer Tim1, SRL indicates the output of the SR enable latch SRL, SR-En indicates that Synchronous Rectification is enabled, SR-Dis indicates that Synchronous Rectification is disabled, and G2 indicates the Synchronous Rectification switch drive signal at the gate G2 of the switch S2.

Figure 3:
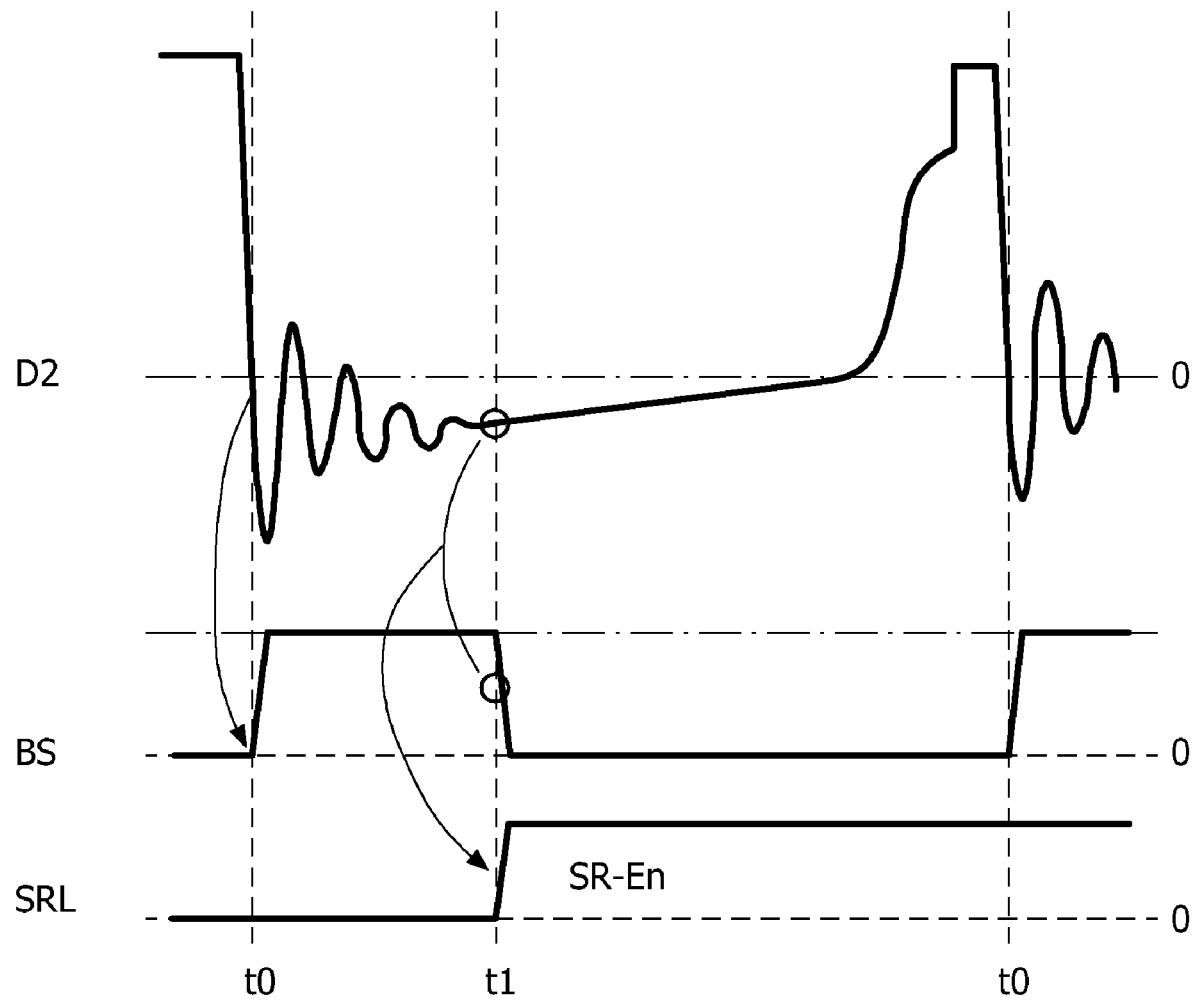
FIGS. 3-6 explain how synchronous rectification is enabled and disabled.
Figure 4:
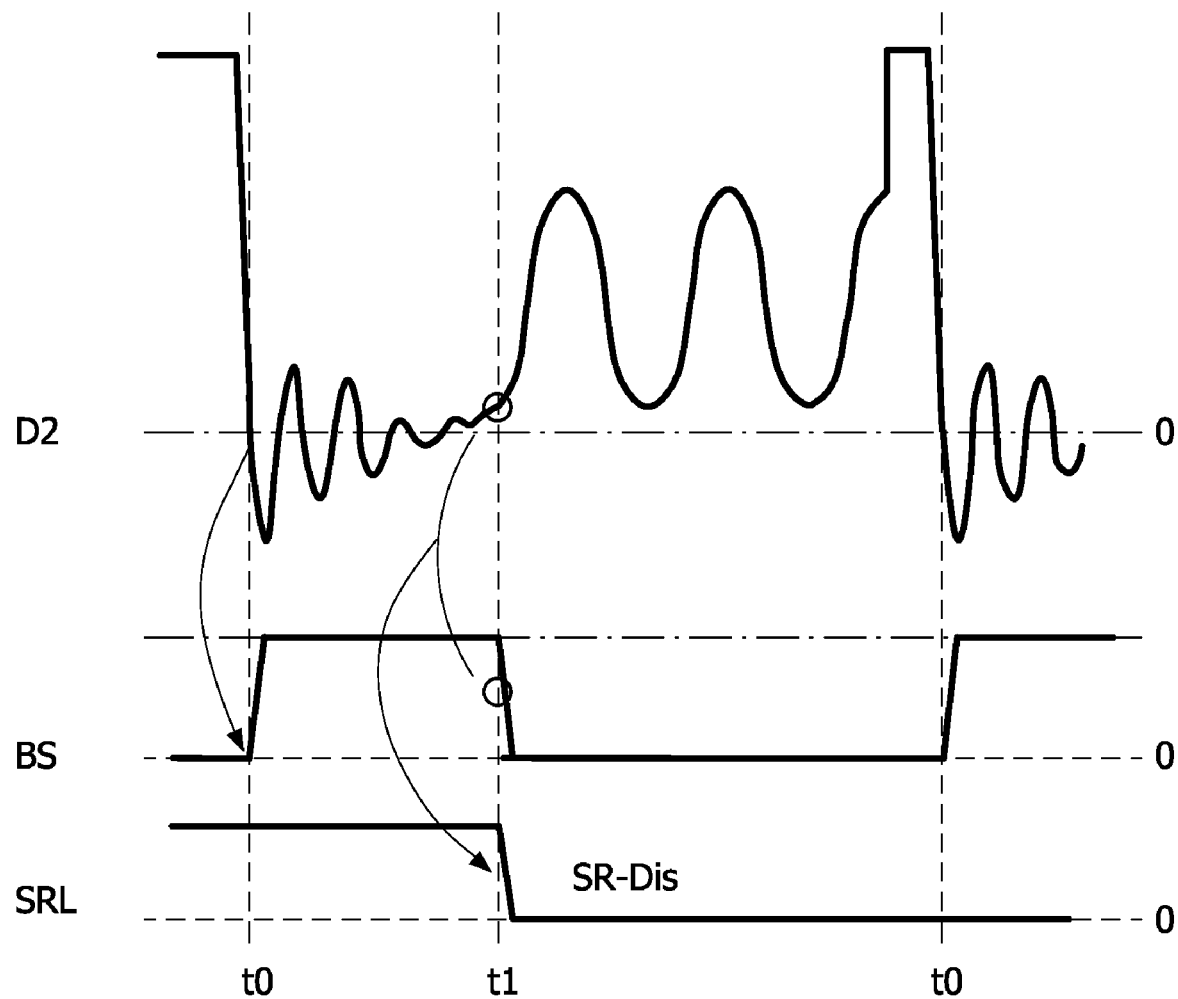
Figure 5:
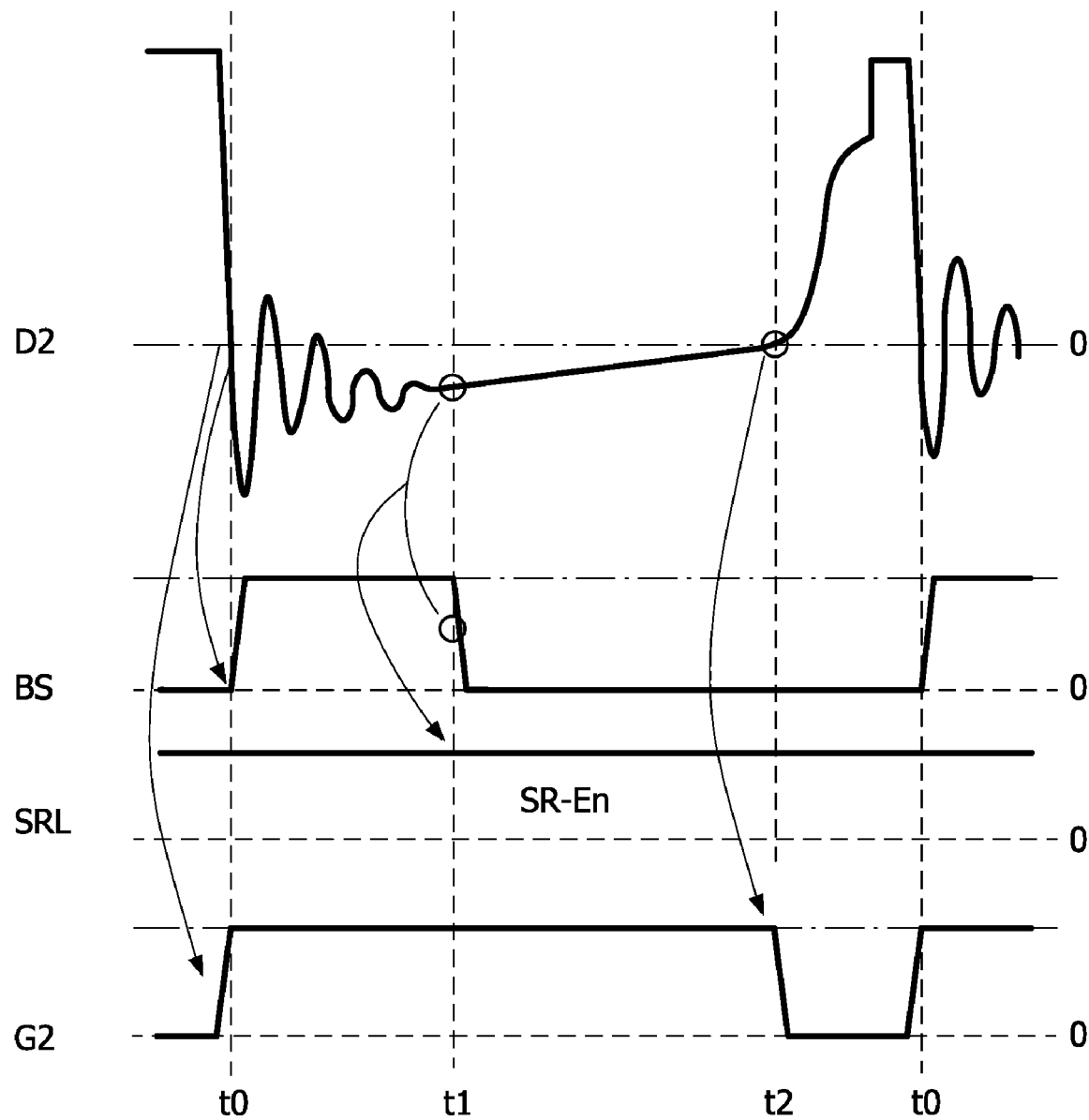
Figure 6:
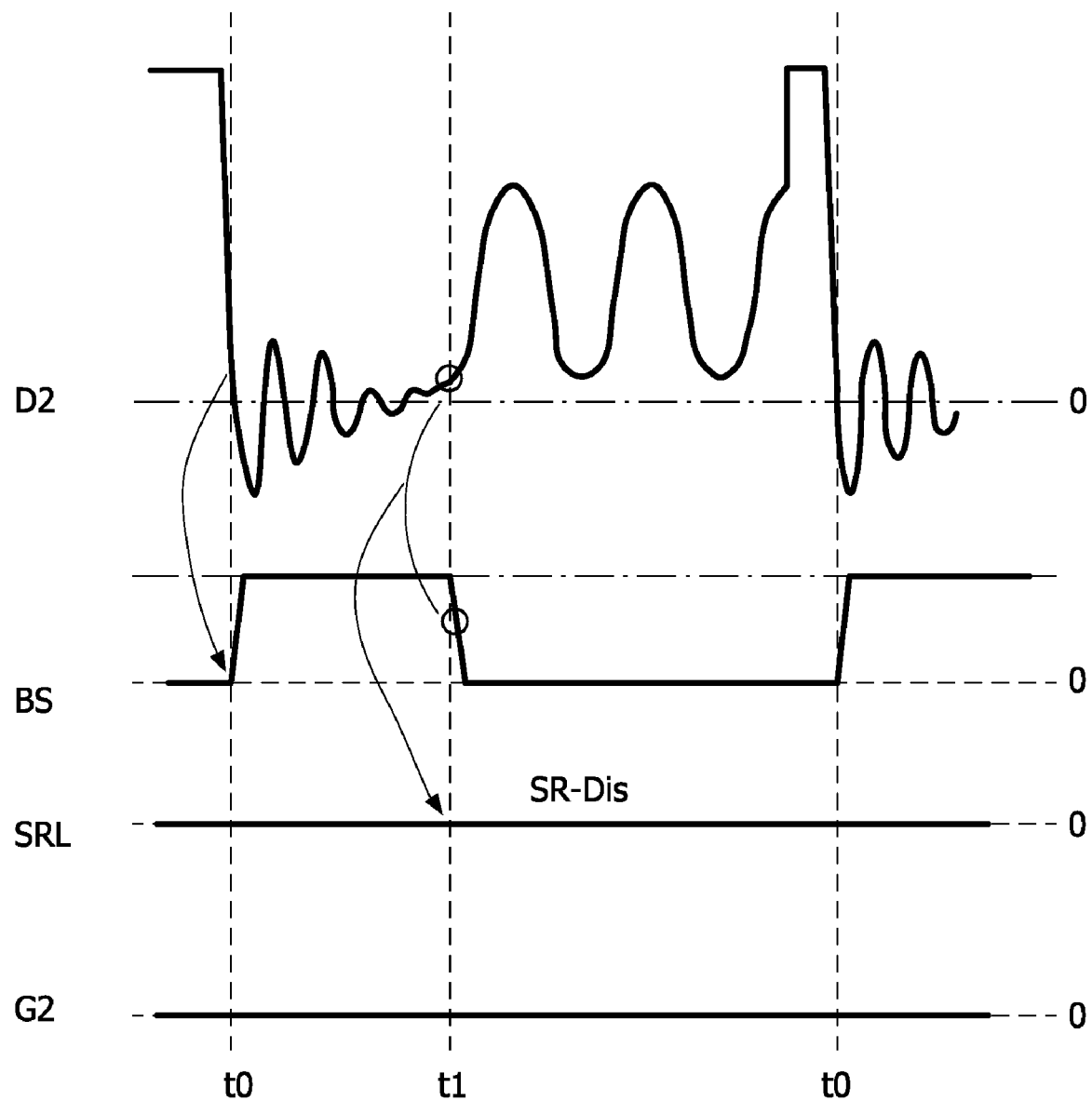

FIG. 3 shows that the drain voltage D2 is sampled at the end of the blanking time. When the drain voltage D2 is negative, synchronous rectification is enabled. FIG. 4 shows that when the drain voltage D2 is positive, synchronous rectification is disabled. FIGS. 5 and 6 show the drive signals for the synchronous rectification switch S2 when synchronous rectification is enabled or disabled. FIG. 5 shows that as long as the drain signal is negative at the end of the blanking time, synchronous rectification is enabled. FIG. 6 shows that as long as the drain signal is positive at the end of the blanking time, synchronous rectification is disabled. The rectification of the output current is done by the body diode of the MOSFET that forms the secondary switch S2.

It should be noted that the above-mentioned embodiments illustrate rather than limit the invention, and that those skilled in the art will be able to design many alternative embodiments without departing from the scope of the appended claims. While in the shown embodiments, a drain voltage of the field-effect transistor D2 is sensed, in an alternative implementation one could sense a current derived from this drain voltage or conceive some other way to obtain a timing signal. If the source voltage of the field-effect transistor D2 is not zero, the drain-source voltage could be measured or one could design some other way to compensate for the non-zero source voltage. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A controller for controlling a field-effect transistor which forms a synchronous rectification switch, the controller comprising:
    a sensing circuit for sensing a drain voltage of the synchronous rectification switch at an end of a blanking time to obtain a sense signal wherein the blanking time defines a minimum-on time of the synchronous rectification switch; and
    a control signal generating circuit for generating a control signal for the synchronous rectification switch in dependence on the sense signal characterized in that synchronous rectification is enabled if at the end of the blanking time the drain voltage is negative and is disabled if at the end of the blanking time the drain voltage is positive.

2. A controller as claimed in claim 1, further comprising a timer for indicating the end of the blanking time a fixed time period after the drain voltage has fallen below zero.

3. A method of controlling a synchronous rectification switch, the method comprising:
    sensing a drain voltage of the synchronous rectification switch at an end of a blanking time to obtain a sense signal wherein the blanking time defines a minimum-on time of the synchronous rectification switch; and
    generating a control signal for the synchronous rectification switch in dependence on the sense signal, such that the synchronous rectification is enabled if at the end of the blanking time the drain voltage is negative and is disabled if at the end of the blanking time the drain voltage is positive.

4. A switched mode power supply circuit, comprising:
    a transformer having a primary winding and a secondary winding;
    a primary switch in series with the primary winding;
    a primary controller for controlling the primary switch;
    a synchronous rectification switch in series with the secondary winding; and
    a secondary controller for controlling a field-effect transistor which forms a synchronous rectification switch, the secondary controller comprising:
    a sensing circuit for sensing a drain voltage an output of the synchronous rectification switch at an end of a blanking time to obtain a sense signal wherein the blanking time defines a minimum-on time of the synchronous rectification switch; and
    a control signal generating circuit for generating a control signal for the synchronous rectification switch in dependence on the sense signal characterized in that synchronous rectification is enabled if at the end of the blanking time the drain voltage is negative and is disabled if at the end of the blanking time the drain voltage is positive.

* * * * *